Figure 1:
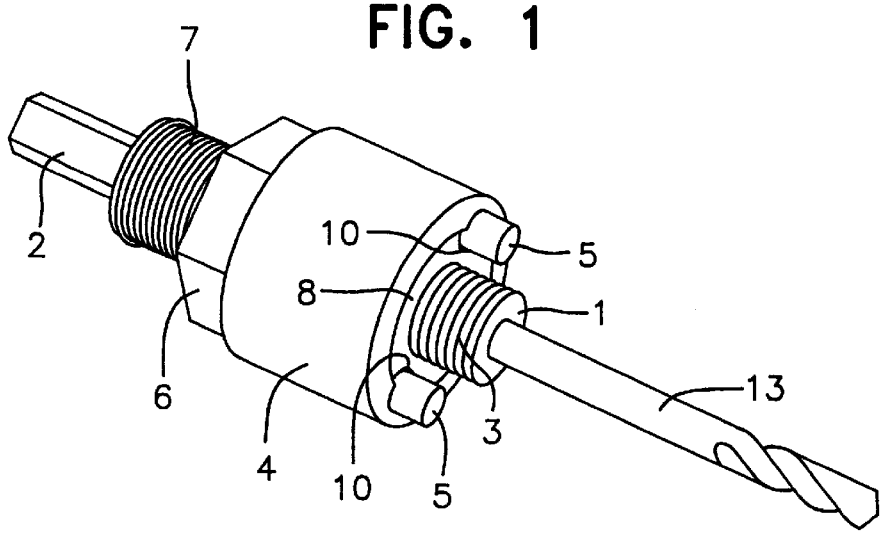

United States Patent
Thuesen

[11] Patent Number: 5,967,709
[45] Date of Patent: Oct. 19, 1999

[54] ADAPTOR FOR ROTATING TOOLS

[76] Inventor: Jorgen Thuesen, 13 Rolfsvej, Frederiksberg, Denmark, DK-2000

[21] Appl. No.: 08/741,966

[22] Filed: Oct. 31, 1996

Related U.S. Application Data

[60] Provisional application No. 60/007,122, Oct. 31, 1995.

[30] Foreign Application Priority Data

Oct. 18, 1995 [DK] Denmark ................. 1175/95
Oct. 17, 1996 [WO] WIPO .............. PCT/DK96/00442

[51] Int. Cl.⁶ ....................................... B23B 51/04
[52] U.S. Cl. ..................... 408/204; 408/209; 408/703
[58] Field of Search .......................... 408/204, 205, 408/206, 209, 203.5, 193, 703, 67, 68

[56] References Cited

U.S. PATENT DOCUMENTS

| | | | |
|---|---|---|---|
| 3,647,310 | 3/1972 | Morse | 408/239 |
| 3,758,221 | 9/1973 | Meshulam . | |
| 3,784,316 | 1/1974 | Bittern | 408/204 |
| 3,837,759 | 9/1974 | Bittern | 408/204 |
| 4,036,560 | 7/1977 | Clark et al. | 408/204 |
| 4,148,593 | 4/1979 | Clark | 408/204 |
| 4,669,928 | 6/1987 | Mediavilla | 408/68 |
| 5,076,741 | 12/1991 | Littlehorn | 408/68 |
| 5,108,235 | 4/1992 | Czyzewski | 408/204 |
| 5,246,317 | 9/1993 | Koetsch et al. | 408/204 |
| 5,352,071 | 10/1994 | Cochran et al. | 408/204 |
| 5,360,300 | 11/1994 | Sullivan | 408/204 |
| 5,435,672 | 7/1995 | Hall et al. | 408/68 |
| 5,466,099 | 11/1995 | Sullivan et al. | 408/206 |
| 5,597,274 | 1/1997 | Behner | 408/703 X |
| 5,658,102 | 8/1997 | Gale | 408/209 X |

FOREIGN PATENT DOCUMENTS 2257381  1/1993  United Kingdom .

Primary Examiner—Andrea L. Pitts
Assistant Examiner—Henry W. H. Tsai
Attorney, Agent, or Firm—Jacobson, Price, Holman & Stern, PLLC

[57] ABSTRACT

An adaptor for stable mounting of a rotating tool in a drilling machine is disclosed, said adaptor comprising a continuous shaft (1), provided in one end with means (2) for fastening in a drilling machine and in the other end with a thread (3) for mounting of the tool, and an element (4), which in relation to the shaft, is movable in axial direction and fixed in the rotating direction, said element being provided with at least one driving pin (5) placed parallel to the shaft, but radially spaced in relation thereto, at least one driving pin being able to engage into a corresponding hole of the tool, characterized in an abutting element, which at least partly can be displaced in axial direction and clamped against the tool.

22 Claims, 4 Drawing Sheets

ADAPTOR FOR ROTATING TOOLS

The present application is based on provisional application Ser. No. 60/007,122, filing date Oct. 31, 1995, which disclosure is incorporated herein by reference.

The present invention relates to an adaptor for rotating tools for mounting in a drilling machine. The rotating tool is generally a saw cup, but can also be a sanding disc.

An often used saw cup for industrial and craftsmanslike purposes is a kind where a supporting plate of the saw cup is provided with a centrally placed threaded hole and two or four holes radially spaced in relation to the threaded hole. This saw cup is designed for mounting in an adaptor, the saw cup being screwed onto a grub screw placed on the adaptor, whereafter one or more driving pins are moved and engaged in one or more of the radially spaced holes.

The prior art discloses various embodiments of such an adaptor, e.g. see GB 2 257 381 A. This publication is disclosed, whereby the saw cup is screwed onto a grub screw of a continuous shaft against a yoke and the saw cup is then turned back a little in order that two driving pins fitted on a spring-loaded sleeve can be moved through holes in the yoke and be placed into the radially spaced holes of the saw cup. On this and other known adaptors, the saw cup is screwed onto a threaded part of the continuous shaft and turned back until the holes of the saw cup are opposite to the driving pins, and the driving pins are eventually moved into the holes.

By this design of the known adaptors the driving pins only lock the saw cup so that it does not turn in relation to the adaptor in the rotation direction when the tool is used. However, the saw cup is not locked in cross directions and will therefore be loose in the thread and vibrate when used. These vibrations result in an inaccurate hole, reduce the durability of the saw cup and are conveyed to the drilling machine, in which the adaptor is mounted.

The object of the present invention is to provide an adaptor for rotating tools, which does not entail the above mentioned disadvantages connected with the prior art.

According to the invention, this object is obtained by an adaptor for rotating tools for mounting in a drilling machine, said adaptor comprising a continuous shaft, provided in one end with means for fastening onto a drilling machine and in the other end with a thread for mounting of the tool, and an element, which in relation to the sahaft is movable in axial direction and fixed in the rotating direction, said element being provided with at least one driving pin placed parallel to the shaft, but radially spaced in relation thereto, at least one driving pin being able to engage into a corresponding hole of the tool, which adaptor is characterized in an abutting element, which at least partly can be displaced in axial direction and clamped against the tool.

The abutting element may be constituted by a sleeve placed on the shaft, said sleeve being preferably clamped by a screw nut, which is displaced when it is turned around a threaded part provided on a middle part of the shaft behind the sleeve. If desired, the abutting element may also be clamped by an element, which is spring-loaded to such an extent that the abutting element, by use of the adaptor, will abut on the supporting plate of the saw cup.

Alternatively, the abutting element can be constituted by a fixed yoke on the shaft, which is provided with holes for the driving pins and a biased element, which at least can be compacted ¼ lead for saw cups with 4 holes for absorption of driving pins (for saw cups with 2 holes, at least ¼ lead). The advantage of this embodiment is that the saw cup is simple and easy to mount, because it is not necessary to turn the saw cup back before the driving pins fitted on the element fixed in the rotating direction are placed in the holes of the saw cup.

To ensure that the element fixed in relation to the shaft in the rotating direction is movable in axial direction any technical solution, where this is obtained, may be used.

In one embodiment, the fixing in the rotating direction is provided by a crossbar in a gap of the shaft, said crossbar connecting the two opposite sides of the inner hole in the element. However, it is preferred, regarding the strength of the shaft, that the shaft is without a weakening gap and that, just behind the threaded part for mounting of tools, it is provided with a stop, e.g. in the shape of a shoulder 18 element, and especially in the shape of a cylindrical sliding element with a diameter, which is larger than the diameters of the surrounding parts of the shaft. Alternatively, a threaded stop can be provided, above which the saw cup cannot be screwed, e.g. by breaking or destroying the thread, or simply because the thread is not any longer. The advantage, by providing the shaft with a stop, is that, according to the invention, the rotating tool always has to be screwed onto the adaptor with the same number of revolutions so that a uniform mounting is ensured.

Preferably, the sliding element has a non-circular cylindrical shape, and the shape of the hole of the sleeve corresponds to the shape of the sliding element in at least part of the extent of the sleeve. The thread, on which the saw cup is fitted, ends in a prefered embodiment, at the sliding element or the shoulder combined with a biased element, which the saw cup is screwed onto in a downwards movement.

Variations from the cylindrical shape, which is provided in the sliding element, may be of any suitable type, e.g. one or more longitudinal faces, scores, chamfers etc.

In case the sliding element is provided with longitudinal chamfers, the driving pins may be provided in the sleeve, so that they extend towards the middle of the shaft, thereby breaking the cylindrical periphery. The driving pins essentially have the same diameter as the chamfers.

Furthermore, the necessary fixing of the sleeve in relation to the continuous shaft in the rotating direction can be secured by one or more spikes extending radially from the sliding element. In this case, the sleeve has to be shaped with corresponding scores to fit the spikes, so that the sleeve is movable in axial direction in relation to the shaft.

The thread, on which the screw nut is displaced, can either be a right-hand or a left-hand thread.

Usually, when the tool is a saw cup, a steering drill is used, which is mounted in the shaft of the adaptor. This drill is fastened by a bolt, which is screwed onto the drill through the sliding element. In one embodiment, this bolt can extend above the surface of the sliding element, so that the bolt can also act as the spike, which extends radially outwards from the sliding element.

The end of the sleeve, which faces the screw nut, may, if desired, be provided by a backing, ensuring that the sleeve cannot move considerably forward in axial direction forward past the sliding element.

Figure 4:
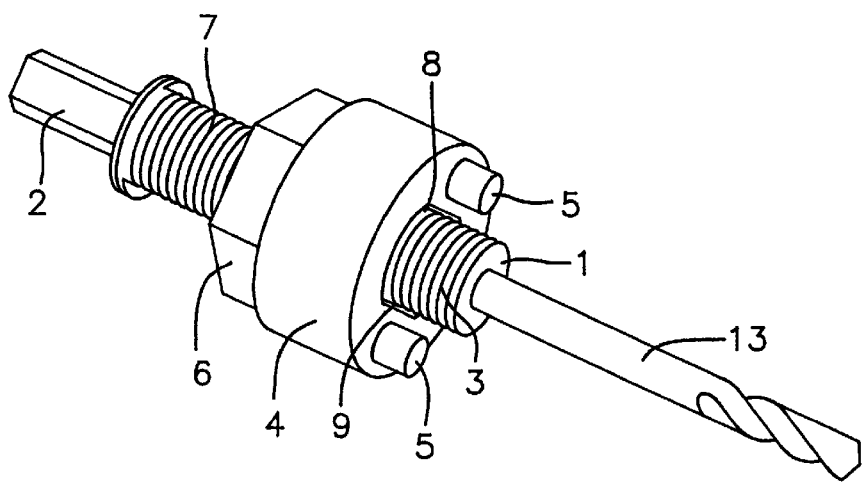
Figure 7:
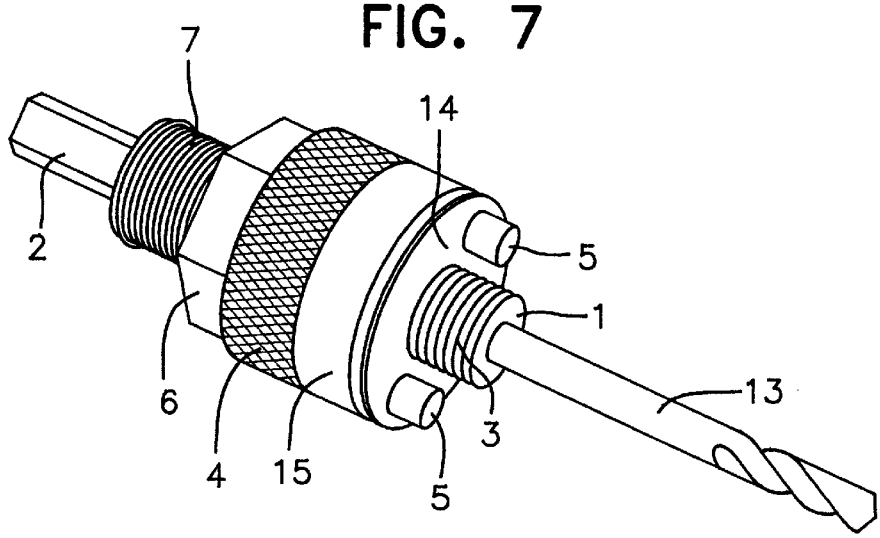
Figure 2:
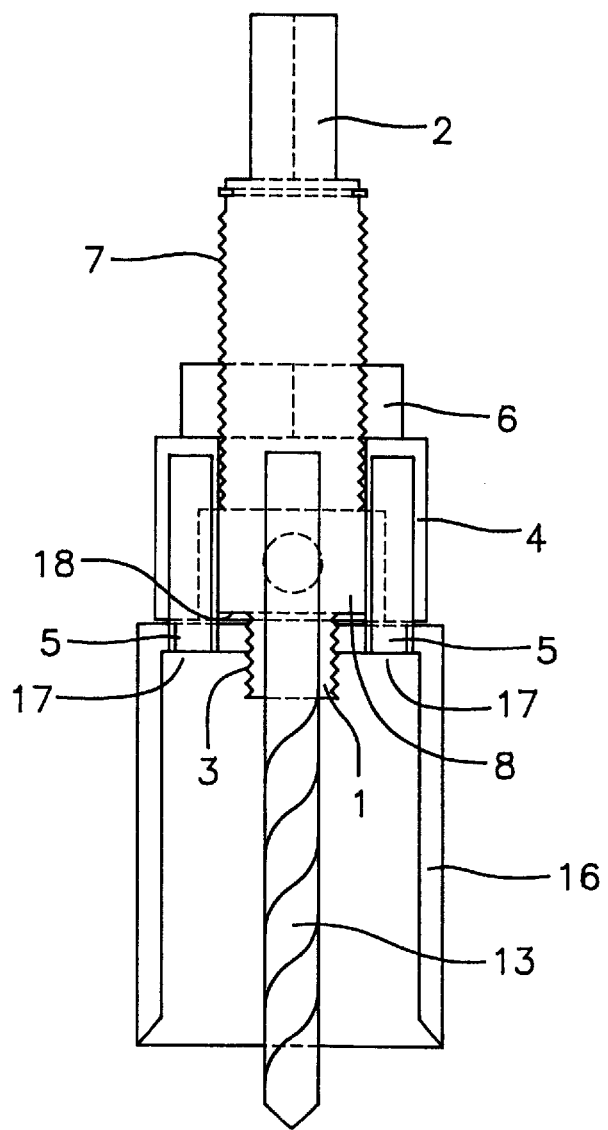
Figure 3:
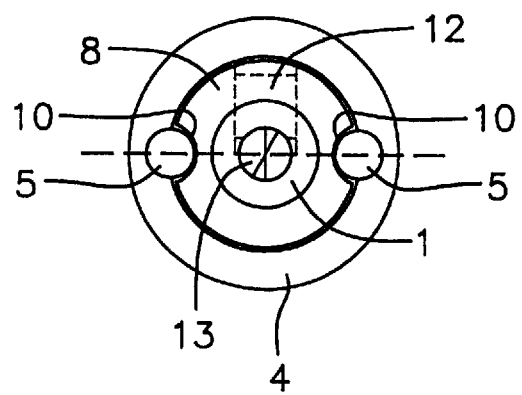
Figure 5:
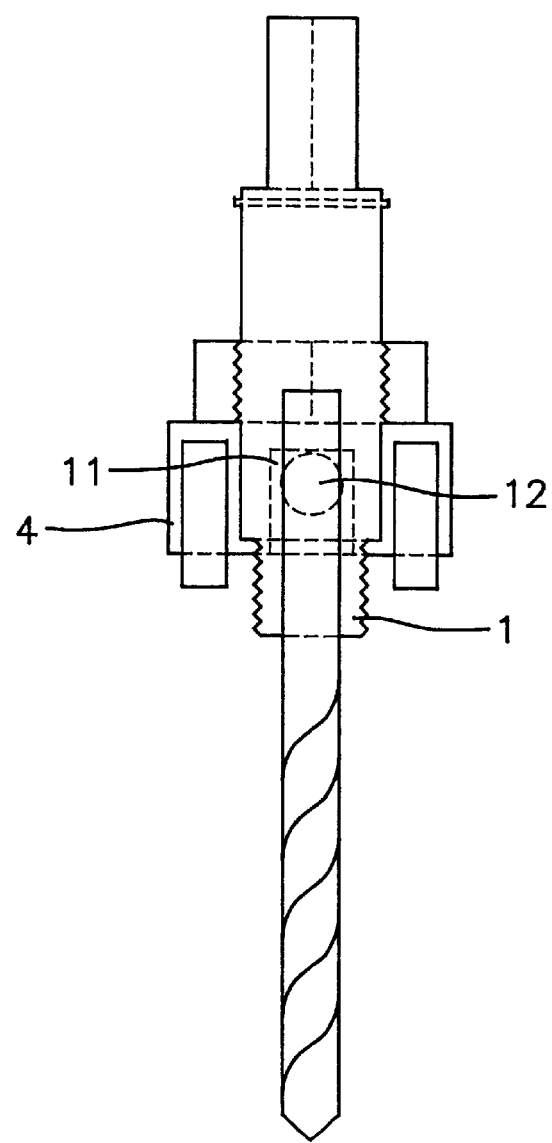
Figure 6:
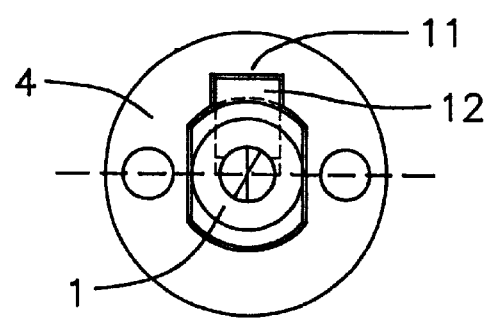
Figure 8:
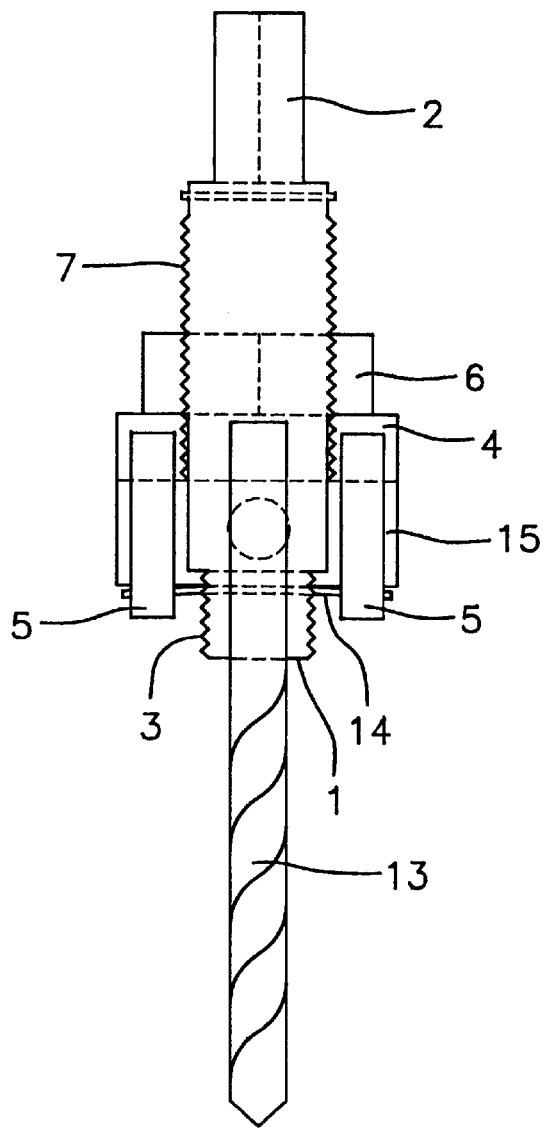
Figure 9:
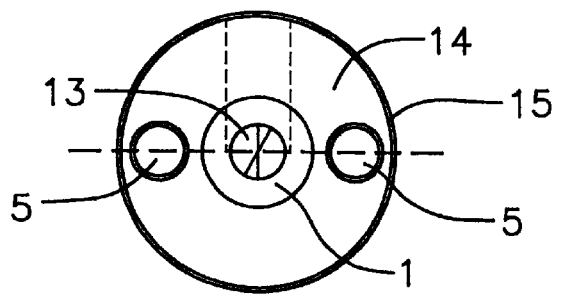

The invention will be illustrated in the following by embodiments referring to the drawing, wherein:

FIG. 1 discloses a perspective view of the adaptor, whereby the driving pins fitted in the sleeve extend into the sliding element provided on the shaft, FIG. 2 discloses a vertical cross-sectional view of the adaptor shown in FIG. 1, FIG. 3 discloses a horizontal cross-sectional view of the adaptor shown in FIG. 1, FIG. 4 discloses a perspective view of an adaptor according to the invention, whereby the irregularities in the circular cylindrical shape of the sliding element are constituted of longitudinal opposing faces, FIG. 5 discloses a vertical cross-sectional view of the adaptor shown in FIG. 4, FIG. 6 discloses a horizontal cross-sectional view of the adaptor shown in FIG. 4, FIG. 7 discloses a perspective view of an adaptor according to the invention, whereby the driving pins are shoved through a yoke provided with a biased element, FIG. 8 discloses a vertical cross-sectional view of the adaptor shown in FIG. 7, and FIG. 9 discloses a horizontal cross-sectional view of the adaptor shown in FIG. 7.

In the embodiment shown in FIG. 1, 2 and 3 the adaptor according to the invention comprises a continuous shaft 1 provided in one end with means 2 for fastening in a drilling machine and in the other end with thread 3 for mounting of a rotating tool. The shaft is provided with a sleeve 4, which is movable in axial direction, but is fixed in the rotating direction. The sleeve 4 is provided with two driving pins 5 placed opposite each other on either side of the shaft 1. A screw nut 6 can, by a thread 7 provided on the shaft 1 behind the sleeve 4, be displaced in axial direction forward and clamped against the sleeve. The shaft 1 is provided with a sliding element 8, which is partly cylindrical with a diameter larger than the surrounding parts of the shaft. The sliding element is provided with two chamfers 10, wherein the driving pins can slide. In the sliding element 8 a threaded hole is provided, in which a screw 12 is fitted for fixing a steering drill 13.

The adaptor for rotating tools is operated in the following way: The rotating tool, e.g. a saw cup 16, is mounted by screwing the threaded hole of the saw cup down onto the threaded part of the shaft util the saw cup is screwed against the sliding element 8. The saw cup 16 is then screwed back so that the two driving pins 5 of the sleeve 4 can be moved into the corresponding holes 17 of the saw cup. Subsequently, the screw nut 6 is displaced forwards on the threaded part until the sleeve 4 abut on the supporting plate of the saw cup 16. By fastening the screw nut, it is ensured that the threaded slack is eliminated and that the saw cup is prevented from rocking in relation to the adaptor, so that when operated, a precise hole and a longer durability of the saw cup is obtained.

FIG. 4 discloses another prefered embodiment according to the invention. Unlike the first embodiment, the irregularities in the partly cylindrical sliding element consist of two opposing faces 9. The sleeve surrounding the sliding element is provided with an inner shape, which corresponds to the shape of the sliding element.

If desired, the two mentioned embodiments in FIG. 1 and 4, respectively, can be altered as shown in FIG. 5 and 6 for the embodiment according to FIG. 4. Thus, the screw 12 is shaped so that it extends above the periphery of the partly cylindrical sliding element 8 into the longitudinal score 11 provided in the sleeve 4.

In the embodiment shown in FIG. 7, 8 and 9, the 5 adaptor consists of a yoke 15 fixed onto the shaft. Behind the yoke a to-and-fro movable sleeve is provided with two driving pins 5, which extend through holes in the yoke. In front of the yoke a biased disc is provided.

When the saw cup is crewed onto, the thread 3, in the rotating moment, the user will sense, when it abuts on the biased disc 14. Thereafter, the user has to screw the saw cup further into the thread until the holes of the saw cup are opposite to the driving pins, whereafter the sleeve 4 with the driving pins is shoved forwards so that the pins engage into the holes of the saw cup. Finally, the screw nut is fastened against the sleeve 4.

I claim:

1. An adaptor for mounting rotating tools in a drilling machine, comprising a) a continuous shaft having a longitudinal axis of rotation and opposing ends, provided in one end with means for fastening in a drilling machine and in the other end with a thread for mounting a tool, b) a sleeve on said shaft which, in relation to the shaft, is movable in the axial direction and fixed in the rotating direction, said sleeve having a hole and being provided with c) at least one driving pin placed parallel to the shaft, but radially spaced in relation thereto, said driving pin being able to engage into a corresponding hole of the tool, and d) an abutting element which, at least in part, can be displaced in the axial direction against the tool, wherein, immediately behind the thread for mounting a tool, the shaft is provided with a partly cylindrical sliding element with a diameter larger than the shaft, said sliding element having a non-circular cylindrical shape, and the shape of the hole of the sleeve corresponds to the shape of the sliding element in at least part of the extent of the sleeve.

2. An adaptor according to claim 1, wherein the abutting element is the sleeve on said shaft, which is axially displacable toward said one end by turning a screw nut (6) maintained on a threaded part provided on the shaft.

3. An adaptor according to claim 2, wherein the shaft includes a shoulder, immediately adjacent the thread for mounting the tool distal to said one end and extending radially beyond said thread.

4. An adaptor according to claim 2, wherein the sleeve includes at least one longitudinal chamfer having a diameter slidably maintaining the driving pin, said driving pin essentially having the same diameter as the chamfer.

5. An adaptor according to claim 1, wherein the shaft includes a shoulder, immediately adjacent the thread for mounting the tool distal to said one end and extending radially beyond said thread.

6. An adaptor according to claim 1, wherein the adaptor has mounted, thereon, a rotating tool.

7. An adaptor according to claim 6, wherein the rotating tool is a saw cup.

8. An adaptor according to claim 1, wherein one or more flat longitudinal faces are provided in the sliding element.

9. An adaptor according to claim 1, wherein at least one longitudinal chamfer having a diameter is provided in the sliding element.

10. An adaptor according to claim 9, wherein the sleeve corresponds to the at least one longitudinal chamfer so that said sleeve is provided with the driving pins extending parallel to the shaft, said driving pins essentially having the same diameter as the chamfers.

11. An adaptor according to claim 8, wherein at least one longitudinal chamfer having a diameter is provided in the sliding element.

12. An adaptor according to claim 11, wherein the sleeve corresponds to the at least one longitudinal chamfer so that said sleeve is provided with the driving pins extending paraller to the shaft, said driving pins essentially having the same diameter as the chamfers.

13. An adaptor for mounting rotating tools in a drilling machine, comprising
   a) a continuous shaft having a longitudinal axis of rotation and opposing ends, provided in one end with means for fastening in a drilling machine and in the other end with a thread for mounting a tool,
   b) a slide element which, in relation to the shaft, is movable in the axial direction and fixed in the rotating direction, said slide element having a hole and being provided with
   c) at least one driving pin placed parallel to the shaft, but radially spaced in relation thereto, said driving pin being able to engage into a corresponding hole of the tool, and
   d) an abutting element which, at least in part, can be displaced in the axial direction and which has a surface, radial to said longitudinal axis, to abut the tool and at least one hole or chamfer opening on said surface for slidably maintaining said pin, wherein the abutting element comprises
      i) a yoke, which is fixed onto the shaft, adjacent the thread distal to said one end, extending radially beyond said thread and provided with at least one hole for slidably maintaining the driving pin, and
      ii) an axially movable biased element annularly displaced about said thread of said shaft.

14. An adaptor according to claim 13, wherein the abutting element is a sleeve on said shaft, which is axially displacable toward said one end by turning a screw nut maintained on a threaded part provided on the shaft.

15. An adaptor according to claim 13, wherein, immediately behind the threaded part for mounting a tool, the shaft is provided with a partly cylindrical sliding element with a diameter larger than the shaft, said sliding element having a non-circular cylindrical shape, and the shape of the hole of the slide element corresponds to the shape of the sliding element in at least part of the extent of the slide element.

16. An adaptor according to claim 13, wherein the shaft includes a shoulder, immediately adjacent the thread for mounting the tool distal to said one end and extending radially beyond said thread.

17. An adaptor for rotating tools for mounting in a drilling machine, comprising a continuous shaft, provided in one end with means for fastening in a drilling machine and in the other end with a thread for mounting of the tool, a slide element which, in relation to the shaft, is movable in axial direction and fixed in the rotating direction, said slide element having a hole and being provided with at least one driving pin placed parallel to the shaft, but radially spaced in relation thereto, at least one driving pin being able to engage into a corresponding hole of the tool, and an abutting element, which at least partly can be displaced in axial direction against the tool, wherein, immediately behind the thread for mounting a tool, the shaft is provided with a partly cylindrical sliding element with a diameter larger than the shaft, said sliding element having a non-circular cylindrical shape, and the shape of the hole of the slide element corresponds to the shape of the sliding element in at least part of the extent of the slide element.

18. An adaptor according to claim 17, wherein one or more flat longitudinal faces are provided in the sliding element.

19. An adaptor according to claim 18, characterized in that the slide element corresponds to the longitudinal chamfer(s) so that said slide element is provided with the driving pins extending towards the middle of the shaft, said driving pins essentially having the same diameter as the chamfers.

20. An adaptor according to claim 18, characterized in that at least one longitudinal chamfer (1) is provided in the sliding element.

21. An adaptor according to claim 17, wherein at least one longitudinal chamfer having a diameter is provided in the sliding element.

22. An adaptor according to claim 21, wherein the sleeve corresponds to the at least one longitudinal chamfer so that said sleeve is provided with the driving pins extending parallel to the shaft, said driving pins essentially having the same diameter as the chamfers.

* * * * *